S. BIREN.
FILTER.
APPLICATION FILED AUG. 6, 1910.
980,748.
Patented Jan. 3, 1911.
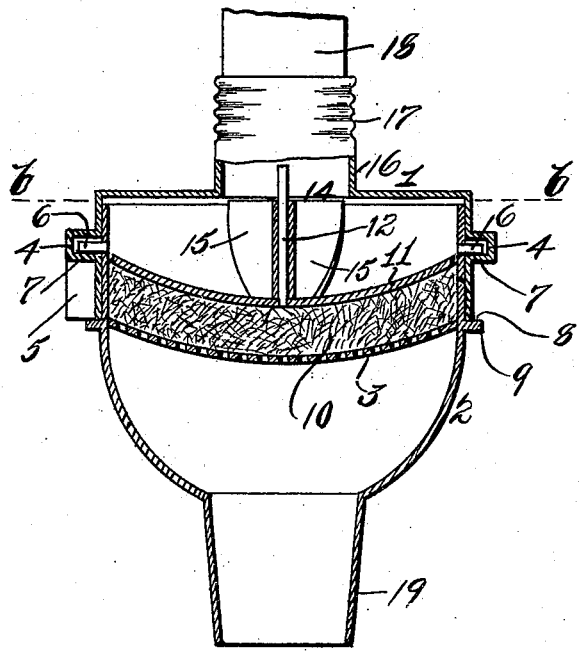
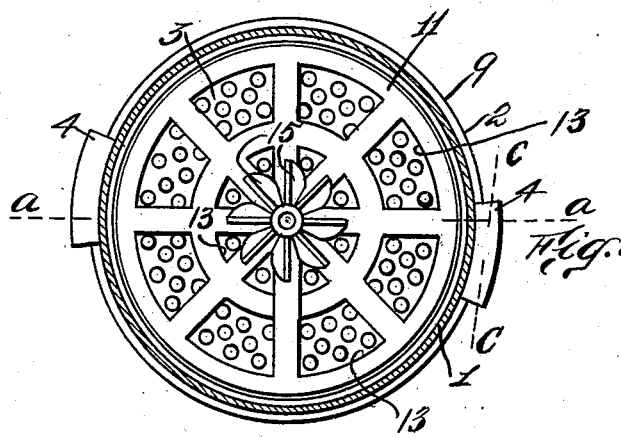
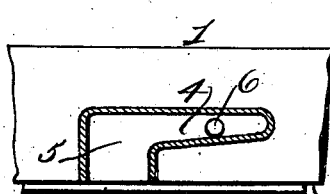
Witnesses:
Inventor:
Simon Biren
attorney.

UNITED STATES PATENT OFFICE.

SIMON BIREN, OF NEW YORK, N. Y.

FILTER.

980,748. Specification of Letters Patent. Patented Jan. 3, 1911.

Application filed August 6, 1910. Serial No. 575,914.

*To all whom it may concern:*

Be it known that I, SIMON BIREN, a citizen of the United States of America, residing in the borough of Brooklyn, county of Kings, city and State of New York, have invented certain new and useful Improvements in Filters, of which the following is a full, clear, and exact description.

This invention relates to an improvement in filters, the object being to provide such a device the members of which are separably connected, one of said members being adapted for attachment to the nozzle of a faucet or spigot for liquids.

Other features of improvement will hereinafter be pointed out.

I will now proceed to describe my invention in detail, the novel features of which will be pointed out in the claims, reference being had to the accompanying drawing, forming part hereof, wherein:—Figure 1 is a vertical sectional view, partly in elevation, of my improved filter, the section being taken on a line *a—a* in Fig. 2; Fig. 2 is sectional plan view thereof, the section being taken on a line *b—b* in Fig. 1; and Fig. 3 is a fragmentary detail view, partly in section, of the base member of the filter, the section being taken on a line *b—b* in Fig. 2, a portion of the chamber being also shown.

Referring to the drawing, my improved filter consists of a member 1 (which for the purposes of distinction, I will call the base-member) and a chamber 2 detachably secured thereto within which is secured a perforated concave disk 3.

The base-member 1 is provided with (in this instance) two tapered channels 4 each having in communication therewith a vertical channel 5 which constitutes an entrance to said tapered channels 4.

To secure the chamber 2 to the base-member 1, I provide the said chamber with pins 6 which are adapted to take into the channels 4, through the entrances 5 and bear against the lower walls 7 of the said channels when the said chamber 2 has been rotated after the pins 6 thereon have been passed through the entrances 5. The above described securing means constitutes a bayonet-joint. When the chamber 2 has been rotated to its full extent the bottom edge 8 of the base-member 1 will be forced against the beading or shoulder 9 on the chamber 2, thereby aiding in the securing of the chamber 2 to the base-member 1.

As a filtering medium, I may use any one of numerous elements well known in this art, such, for instance, as prepared cotton, indicated by 10 in Fig. 1. Within the chamber member 1 and above the filtering element 10, I place a concave disk provided with a pin 12. The disk 11 is loose within the chamber and can be removed therefrom. The disk 11 is perforated as at 13 for the passage therethrough of a liquid and for the same reason the disk 3 is perforated.

Upon the pin 12, I loosely mount a fan 14 having helical wings 15. The upper end of the fan 14 is located at the mouth of the tubular extension 16, which in turn is threaded as at 17 to adapt it for attachment to a faucet or spigot 18. As the water leaves the faucet and flows through the extension 16, it will strike the fan 14 and revolve same rapidly, which will tend to cause the liquid to spread, and thereby cause it to be distributed over the surface of the filtering element 10 through which it will percolate into the chamber 2, through the perforations in the disk 3; thence out through the spout 19.

To clean the filter it is but necessary to rotate the chamber 2 until the pins 6 come opposite the channels 5, at which time the said chamber may be pulled from the base 1.

It is quite apparent that the chamber 2 may be taken from the base 1 without taking the base from the faucet.

Having now described my invention, what I claim and desire to secure by Letters Patent is:—

1. A filter, consisting of a base-member adapted for attachment to a faucet, a chamber member detachably secured thereto, a plurality of perforated concaved disks within said chamber, and a rotatable fan carried by one of said disks and located in the path of the flow of liquid.

2. A filter consisting of a base-member adapted for attachment to a faucet, a chamber detachably secured thereto, a fixed perforated disk within said chamber member, a removable perforated disk also carried by said chamber, a pin carried by said removable disk and a fan carried by said pin adapted for rotation thereupon, said fan being located in the path of flow of the liquid.

Signed at New York city, N. Y. this 5th day of August 1910.

SIMON BIREN.

Witnesses:
 EDWARD A. JARVIS,
 MAURICE BLOCK.